(12) United States Patent
Kawamura

(10) Patent No.: US 7,302,454 B2
(45) Date of Patent: Nov. 27, 2007

(54) METHOD AND SYSTEM FOR DATA PROCESSING WITH DATA BACKUP

(75) Inventor: Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/476,826

(22) Filed: Jun. 29, 2006

(65) Prior Publication Data

US 2006/0248125 A1    Nov. 2, 2006

Related U.S. Application Data

(63) Continuation of application No. 10/914,095, filed on Aug. 10, 2004, now Pat. No. 7,099,903.

(30) Foreign Application Priority Data

Apr. 22, 2004   (JP)   ............................. 2004-126779

(51) Int. Cl.
  *G06F 12/00* (2006.01)
  *G06F 17/30* (2006.01)
(52) U.S. Cl. .................................................. 707/204
(58) Field of Classification Search ................ 707/200, 707/202, 204, 100
  See application file for complete search history.

(56) References Cited

U.S. PATENT DOCUMENTS

| | | | |
|---|---|---|---|
| 5,522,037 A | 5/1996 | Kitagawa et al. | |
| 6,640,291 B2 | 10/2003 | Fujibayashi et al. | |
| 2003/0074600 A1 | 4/2003 | Tamatsu | |
| 2003/0120674 A1 | 6/2003 | Morita et al. | |
| 2003/0229819 A1 | 12/2003 | Kodama | |
| 2004/0172512 A1 | 9/2004 | Nakanishi et al. | |
| 2004/0199733 A1 | 10/2004 | Watanabe et al. | |
| 2005/0081089 A1 | 4/2005 | Havardenv et al. | |
| 2005/0086432 A1 | 4/2005 | Sakai | |
| 2005/0086445 A1 | 4/2005 | Mizuno et al. | |

FOREIGN PATENT DOCUMENTS

JP    07-084728    3/1995

OTHER PUBLICATIONS

LAN-Free Backups Using the Sun StorEdge Instant Image 3.0 Software, Jun. 2002, 13 pages, Sun Microsystems.

*Primary Examiner*—Sam Rimell
*Assistant Examiner*—Alicia M Lewis
(74) *Attorney, Agent, or Firm*—Antonelli, Terry, Stout & Kraus, LLP.

(57) ABSTRACT

The invention relates to backup processing for performing backup of data used in an information processing device having a storage unit. When data has been updated, updated bit information indicating that the data has been updated is stored in an update bitmap management table stored in the storage unit. When the number of updated bit information in the update bitmap management table has reached a differential backup reference value for estimating differential backup time, the backup of data corresponding to the updated information is commanded. When the command for the backup is received, the updated bit information stored in the update bitmap management table in the storage unit is read out. Then, the backup of the data corresponding to the updated bit information is obtained.

2 Claims, 12 Drawing Sheets

FIG. 8

BACKUP MANAGEMENT TABLE

| NAME OF DB REGION | TYPE OF BACKUP | BACKUP START TIME | BACKUP COMPLETION TIME | NAME OF BACKUP DESTINATION FILE | UPDATED BITMAP INFORMATION |
|---|---|---|---|---|---|
| DBAREA1 | FULL | | | | 11111111... |
| DBAREA2 | DIFFERENTIAL | | | | 0010010100... |
| DBAREA3 | DIFFERENTIAL | | | | 1000101001... |

FIG. 11

BACKUP MANAGEMENT TABLE

| NAME OF DB REGION | TYPE OF BACKUP | LUN | BACKUP START TIME | BACKUP COMPLETION TIME | BACKUP DESTINATION LUN | UPDATED BITMAP INFORMATION |
|---|---|---|---|---|---|---|
| DBAREA1 | FULL | | | | | 11111111··· |
| DBAREA2 | DIFFERENTIAL | | | | | 0010010100··· |
| DBAREA3 | DIFFERENTIAL | | | | | 1000101001··· |

# METHOD AND SYSTEM FOR DATA PROCESSING WITH DATA BACKUP

INCORPORATED BY REFERENCE

This application is a continuation of U.S. application Ser. No. 10/914,095, filed Aug. 10, 2004 now U.S. Pat. No. 7,099,903, and also claims priority from Japanese application JP 2004-126779 filed on Apr. 22, 2004, the contents of which are hereby incorporated by reference into this application.

BACKGROUND OF THE INVENTION

The present invention relates to backup processing for performing backup of data used in an information processing device. More specifically, the invention relates to a technology that is effective when applied to the backup processing, which facilitates estimation of backup processing time and recovery processing time.

Conventionally, when performing backup of data used in information processing devices, a differential backup method is employed for reducing the amount of the backup. For managing a difference of data before and after a change, there is provided a method that uses a differential bitmap. In a backup processing method that uses this differential bitmap, a differential backup or a full backup is performed according to the number of updated bits marked on the differential bitmap (refer to JP-A-7-84728, for example).

SUMMARY OF THE INVENTION

In the conventional backup processing method, a backup processing request is basically made at a predetermined date and time according to schedule management. However, scheduling in view of the amount of backup is not performed. Thus, if differential backups are performed at predetermined dates and times according to the schedule management, the amount of data to be backed up differs for each differential backup. The time for backup processing therefore differs for each differential backup, so that it becomes difficult to estimate the backup processing time. Further, if a failure should occur, the amount of backup data for recovery processing also differs for each backup. Thus, it also becomes difficult to estimate the time for the recovery processing.

An object of the present invention is therefore to solve the above-mentioned problems and provide a technology that can facilitate estimation of backup processing time and recovery processing time by obtaining differential backups of a predetermined size.

In a backup processing system of the present invention for performing backup of data used in an information processing device, when the number of updated bit information in an update bitmap management table has reached a predetermined reference value for estimating differential backup processing time, backup of data corresponding to the updated bit information is obtained.

In the backup processing system according to the present invention, which may be a computer, the information processing device, or a program or an object for performing backup processing, the update bitmap management table is provided for either of storage devices in the host computer or the storage device subsystem of the backup processing system. The update bitmap management table is provided for managing whether data in the storage device of the backup processing system has been updated, using a bitmap.

When data in a backup target region in the storage device has been updated through execution of database processing, the bitmap processing unit of the present invention stores in the update bitmap management table in the storage device updated bit information indicating that the data has been updated, reads out updated information from the update bitmap management table, and counts the number of the updated information.

Then, the bitmap processing unit compares the counted number of the updated bit information with the differential backup reference value for estimating the differential backup time. When the counted number of the updated bit information has reached the differential backup reference value, the bitmap processing unit commands a backup processing unit to perform backup of data corresponding to the updated bit information.

The differential backup reference value is calculated from the size of the storage region for storing data for differential backup and the size of data corresponding to updated bit information. For calculation of the differential backup reference value, a backup region is accessed, for example, and the size of the storage region for storing the data for the differential backup is obtained. Then, division of the obtained size by the size of data equivalent to one updated bit information is performed, and the result of the division with a resulting remainder rounded down is set to the differential backup reference value.

The differential backup reference value may also be calculated from the time assigned for obtaining a backup and the time required for backing up the data equivalent to one updated bit information. More specifically, the time assigned for obtaining the backup is divided by the time required for transferring the data equivalent to one updated bit information from a backup target region to the backup region. Then, the result of the division with the resulting remainder rounded down may be set to the differential backup reference value.

The backup processing unit of the present invention receives the command for the backup from the bitmap processing unit, reads out updated information stored in the update bitmap management table in the storage device, reads out data corresponding to the updated bit information from the backup target region in the storage device, and then stores the data in the backup region, thereby obtaining the differential backup.

As described before, in the present invention, when the number of updated bit information in the update bitmap management table has reached the differential backup reference value, the differential backup is obtained. Thus, the size of the data for the differential backup becomes a predetermined size equivalent to the differential backup reference value. Accordingly, estimation of the processing time required for obtaining the differential backup can be performed easily. Further, even if recovery processing is performed when a failure occurs, recovery from the differential backup of the predetermined size will be performed. Estimation of the processing time required for the recovery from the differential backup can be performed easily.

According to the present invention, when the number of updated bit information in the update bitmap management table has reached the predetermined reference value for estimating the backup processing time, backup of data corresponding to the updated bit information is obtained. Thus, by obtaining the differential backup of the predetermined size, estimation of the processing times required for backup processing and recovery processing can be performed easily.

BRIEF DESCRIPTION OF THE DRAWINGS

FIG. 8 is a table showing an example of a backup management table managed by a host computer in the first embodiment;

FIG. 11 is a table showing an example of a backup management table managed by a storage device in the second embodiment.

DESCRIPTION OF THE EMBODIMENTS

First Embodiment

A backup processing system according to a first embodiment of the present invention, for performing backup of database data used in processing on a database will be described below.

Figure 1:
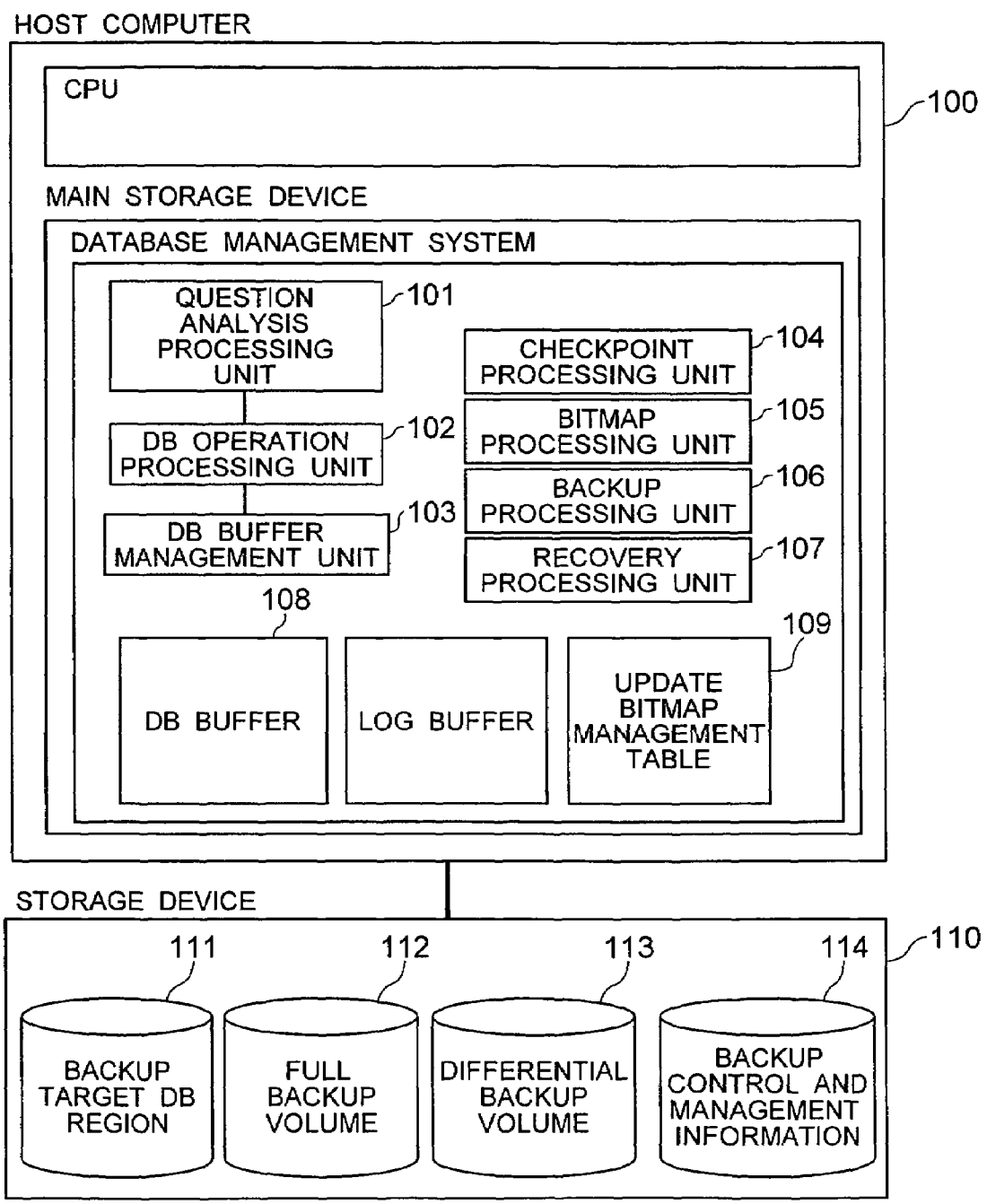
FIG. 1 is a diagram showing a schematic configuration of a backup processing system according to a first embodiment of the present invention.

FIG. 1 is a diagram showing a schematic configuration of the backup processing system in this embodiment. As shown in FIG. 1, a host computer 100 in this embodiment includes a question analysis processing unit 101, a DB operation processing unit 102, a DB buffer management unit 103, a check point processing unit 104, a bitmap processing unit 105, a backup processing unit 106, and a recovery processing unit 107.

The question analysis processing unit 101 is the processing unit that receives a processing request on the database and analyzes the processing request. The DB operation processing unit 102 is the processing unit that performs operation processing on the database according to the content of the analyzed processing request. The DB buffer management unit 103 is the processing unit that stores a DB block received from a storage device 110 in a DB buffer 108 for management and controls access to a backup target DB region 111 in the storage device 110 through the DB buffer 108.

The checkpoint processing unit 104 transmits a request for writing all DB blocks updated at the DB buffer 108 from the host computer 100 to the storage device 110 when the need for reflecting the content of the DB buffer 108 on the backup target DB region 111 in the storage device 110 occurs, and commands the bitmap processing unit 105 to update an update bitmap management table 109.

When data in the backup target DB region 111 has been updated, the bitmap processing unit 105 stores updated bit information indicating the data has been updated in the update bitmap management table 109 in a main storage device. When the number of updated bit information in the update bitmap management table 109 has reached a differential backup reference value for estimating differential backup processing time, the bitmap processing unit 105 commands the backup processing unit 106 to perform backup of data in the backup target DB region 111 corresponding to the updated bit information to a differential backup volume 113. In this embodiment, management of updated data is performed using an update bitmap. However, a method using location information and identification information on the updated data can also be adopted.

The backup processing unit 106 receives the command for the backup, reads out the updated bit information stored in the update bitmap management table 109 in the main storage device, and duplicates the data in the backup target DB region 111 corresponding to the updated bit information to the differential backup volume 113 or duplicates all data in the corresponding DB region in the backup target DB region 111 to the full backup volume 112 so as to obtain a backup.

The recovery processing unit 107 duplicates data from the full backup volume 112 or the differential backup volume 113 to the backup target DB region 111 when a failure occurs, thereby performing recovery processing of the databases.

A program for causing the host computer 100 to function as the question analysis processing unit 101, DB operation processing unit 102, DB buffer management unit 103, checkpoint processing unit 104, bitmap processing unit 105, backup processing unit 106, and recovery processing unit 107 is recorded in a recording medium such as a CD-ROM and stored in a magnetic disc or the like. Then, the program is to be loaded into a memory for running. As the recording medium for recording the program, other recording medium except for the CD-ROM may be employed. Further, the program may be installed from the recording medium to an information processing device, for use. Alternatively, the recording medium may be accessed through a network so as to use the program.

The host computer 100 further includes the DB buffer 108 and the update bitmap management table 109.

The DB buffer 108 is a storage region for temporarily holding the content of the backup target DB region 111 in the storage device 110. The update bitmap management table 109 is the management table for managing whether data in the backup target DB region 111 in the storage device 110 has been updated or not by using bit information.

The storage device 110 includes the backup target DB region 111, full backup volume 112, differential backup volume 113, and backup control and management information 114.

The backup target DB region 111 is the storage region for storing database data to be backed up. The full backup volume 112 is the storage region for storing all data in the backup target DB region 111 at the time of a full backup.

The differential backup volume 113 is the storage region for storing data in the backup target DB region 111 corresponding to updated bit information, at the time of a differential backup. The backup control and management information 114 is the management information indicating the name of a DB region on which backup processing has been performed, the type of backup, the start time and the end time of the backup, a backup destination and updated bitmap information, and the like.

When processing in a database management system is started by the host computer 100 in this embodiment, the question analysis processing unit 101 receives a request for processing on the database and performs analysis processing. Then, the DB operation processing unit 102 performs operation processing on the database according to the content of the analyzed processing request. At this occasion, the DB buffer management unit 103 performs input request processing on a page including data needed for the database processing, stores a DB block received from the storage device 110 in the DB buffer 108, and commands the bitmap processing unit 105 to update the update bitmap management table 109 as necessary.

Figure 2:
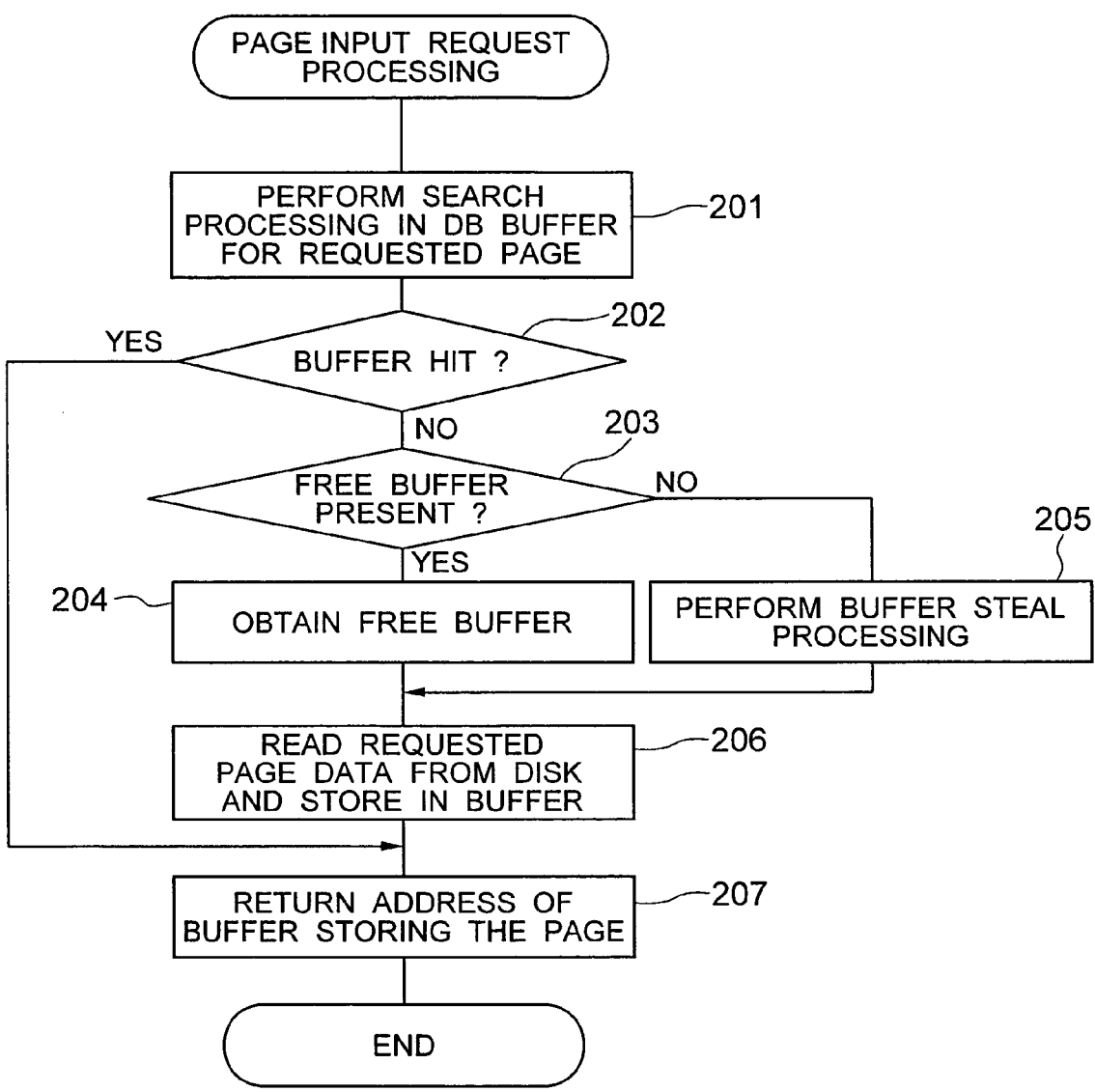
FIG. 2 is a flowchart showing processing steps for page input request processing in the first embodiment.

FIG. 2 is a flowchart showing processing steps for the page input request processing. At step 201, the DB buffer management unit 103 in the host computer 100 executes search processing for performing a search in the DB buffer 108, and checks whether a page requested for the database processing is stored in the DB buffer 108 or not.

At step 202, the DB buffer management unit 103 checks the result of the search processing. When there is not a buffer hit, or when the requested page is not stored in the DB buffer 108, the operation proceeds to step 203.

At step 203, the DB buffer management unit 103 checks whether a free buffer is present in the DB buffer 108 or not. If there is the free buffer, the operation proceeds to step 204. If there is not the free buffer, the operation proceeds to step 205.

At step 204, the free buffer in the DB buffer 108 is obtained. On the other hand, at step 205, buffer steal processing is performed as shown in FIG. 3, thereby obtaining a buffer in the DB buffer 108.

At step 206, the DB buffer management unit 103 reads data on the requested page from the backup target DB region 111 in the storage device 110, and then stores the data on the requested page in the free buffer obtained at step 204 or the buffer obtained at step 205.

At step 207, the DB buffer management unit 103 returns the buffer address of the buffer in which the data on the requested page has been stored at step 206 or the buffer address of the buffer for which the buffer hit has been found at step 202 to the calling source of the page input request processing, thereby completing the processing.

Figure 3:
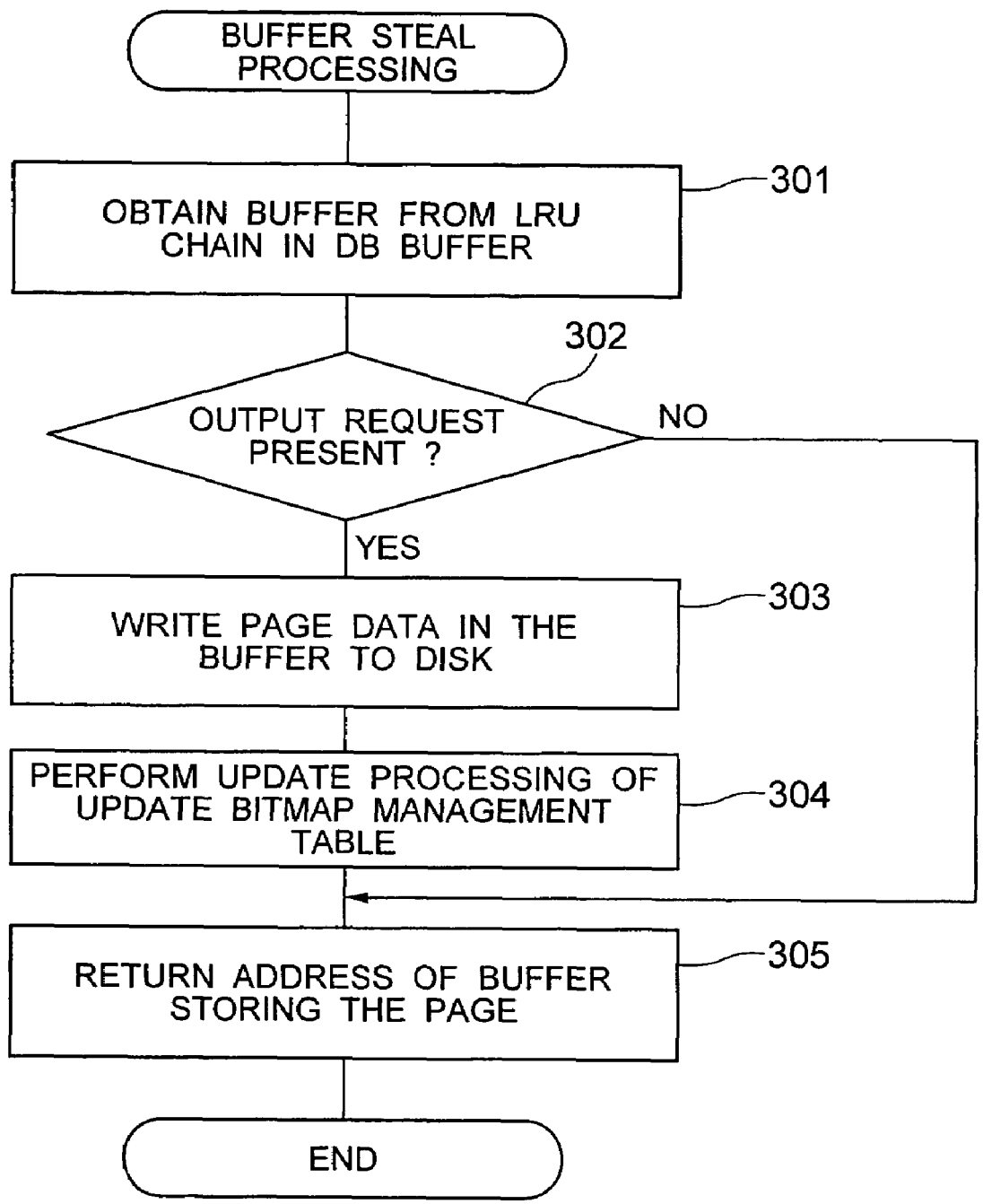
FIG. 3 is a flowchart showing processing steps for buffer steal processing in the first embodiment.

FIG. 3 is a flowchart showing processing steps for buffer steal processing in this embodiment. At step 301, the DB buffer management unit 103 in the host computer 100 searches for a buffer least recently used among an LRU (Least Recently Used) chain in the DB buffer 108, and obtains the buffer address of the buffer searched for.

At step 302, the DB buffer management unit 103 refers to updated information indicating whether data in the buffer is updated or not, and checks whether the data in the buffer is updated in the DB buffer 108 or not. If the data in the buffer is updated, or a request for outputting the data in the buffer to the storage device 110 is present, the operation proceeds to step 303. The updated information is stored in a predetermined region in the buffer, other table, or the like when the data in the buffer is updated.

At step 303, a write command for writing the content of the buffer to the storage device 110 is created, and the write command is transmitted to the storage device 110, thereby making a request for writing the page of the buffer. The storage device 110 receives the write command, writes page data to the cache memory and the backup target DB region 111 of the storage device 110, and reflects the updated content of the buffer on the cache memory and the backup target DB region 111 of the storage device 110. Alternatively, writing to the backup target DB region 111 may be performed just by performing writing to the cache memory of the storage device 110.

At step 304, the DB buffer management unit 103 gives the access destination address to be accessed by the created write command to the bitmap processing unit 105, and commands the bitmap processing unit 105 to update bit information of the update bitmap management table 109, corresponding to the data in the buffer.

At step 305, the DB buffer management unit 103 returns the address of the buffer obtained at step 301 to the calling source of the buffer steal processing, thereby completing the processing.

When the need for reflecting the content of the DB buffer 108 on the backup target DB region 111 in the storage device 110 arises, the checkpoint processing unit 104 in the host computer 100 in this embodiment transmits a request for writing all DB blocks updated at the DB buffer 108 from the host computer 100 to the storage device 110 and commands the bitmap processing unit 105 to update the update bitmap management table 109.

Figure 4:
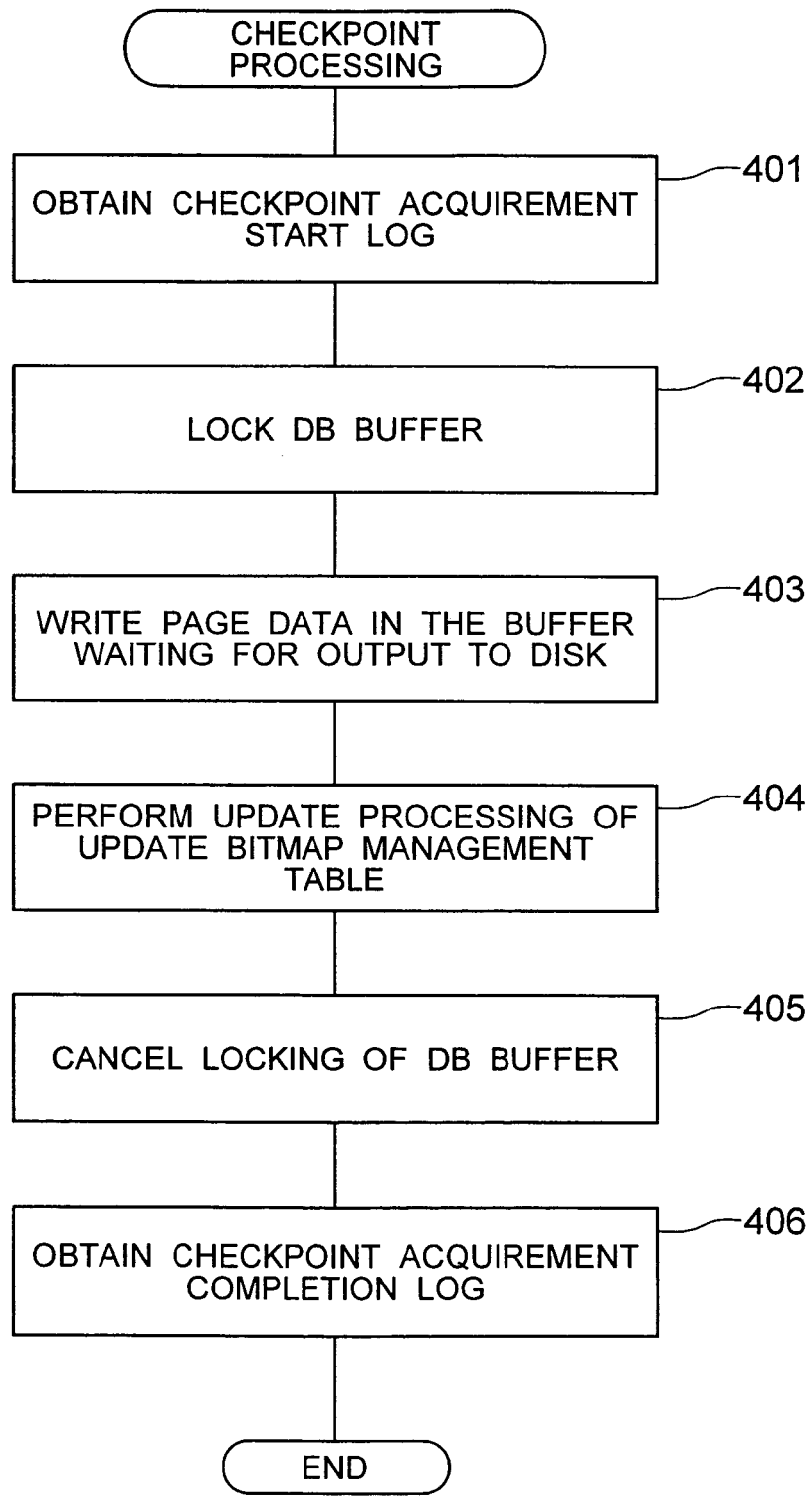
FIG. 4 is a flowchart showing processing steps for checkpoint processing in the first embodiment.

FIG. 4 is a flowchart showing processing steps for checkpoint processing in this embodiment. At step 401, the checkpoint processing unit 104 creates a checkpoint acquirement start log indicating that acquirement of a checkpoint has been started and stores the checkpoint acquirement start log in a log buffer.

At step 402, the DB buffer 108 is locked, and update processing on the DB buffer 108 is temporarily stopped.

At step 403, the write command for writing pages in the DB buffer 108 waiting for output or all pages updated in the DB buffer 108 to the storage device 110 is created, and the checkpoint processing unit 104 transmits the write command to the storage device 110, thereby making a request for writing the pages. The storage device 110 receives the write command, writes the data on the pages to the cache memory and the backup target DB region 111 of the storage device 110, thereby reflecting the updated content of the DB buffer 108 on the cache memory and the backup target DB region 111 of the storage device 110. Alternatively, writing to the backup target DB region 111 may be performed just by performing writing to the cache memory of the storage device 110.

At step 404, the checkpoint processing unit 104 gives the access destination address to be accessed by the created write command to the bitmap processing unit 105, and commands the bitmap processing unit 105 to update bit information in the update bitmap management table 109, corresponding to the updated page data.

At step 405, locking of the DB buffer 108 is cancelled, and update processing on the DB buffer 108 is resumed.

At step 406, the checkpoint processing unit 104 creates a checkpoint acquirement completion log indicating that acquirement of the checkpoint has been completed and stores the checkpoint acquirement completion log in the log buffer.

When data in the cache memory and the backup target DB region 111 of the storage device 110 has been updated by the DB buffer management unit 103 and the checkpoint processing unit 104 as described above, the bitmap processing unit 105 of the host computer 100 in this embodiment stores in the update bitmap management table 109 in the main storage device updated bit information indicating that the data has been updated. When the number of updated bit information in the update bitmap management table 109 has reached the differential backup reference value for estimating the differential backup processing time, the bitmap processing unit 105 commands the backup processing unit 106 to perform backup of data in the backup target DB region 111, corresponding to the updated bit information to the differential backup volume 113.

Figure 5:
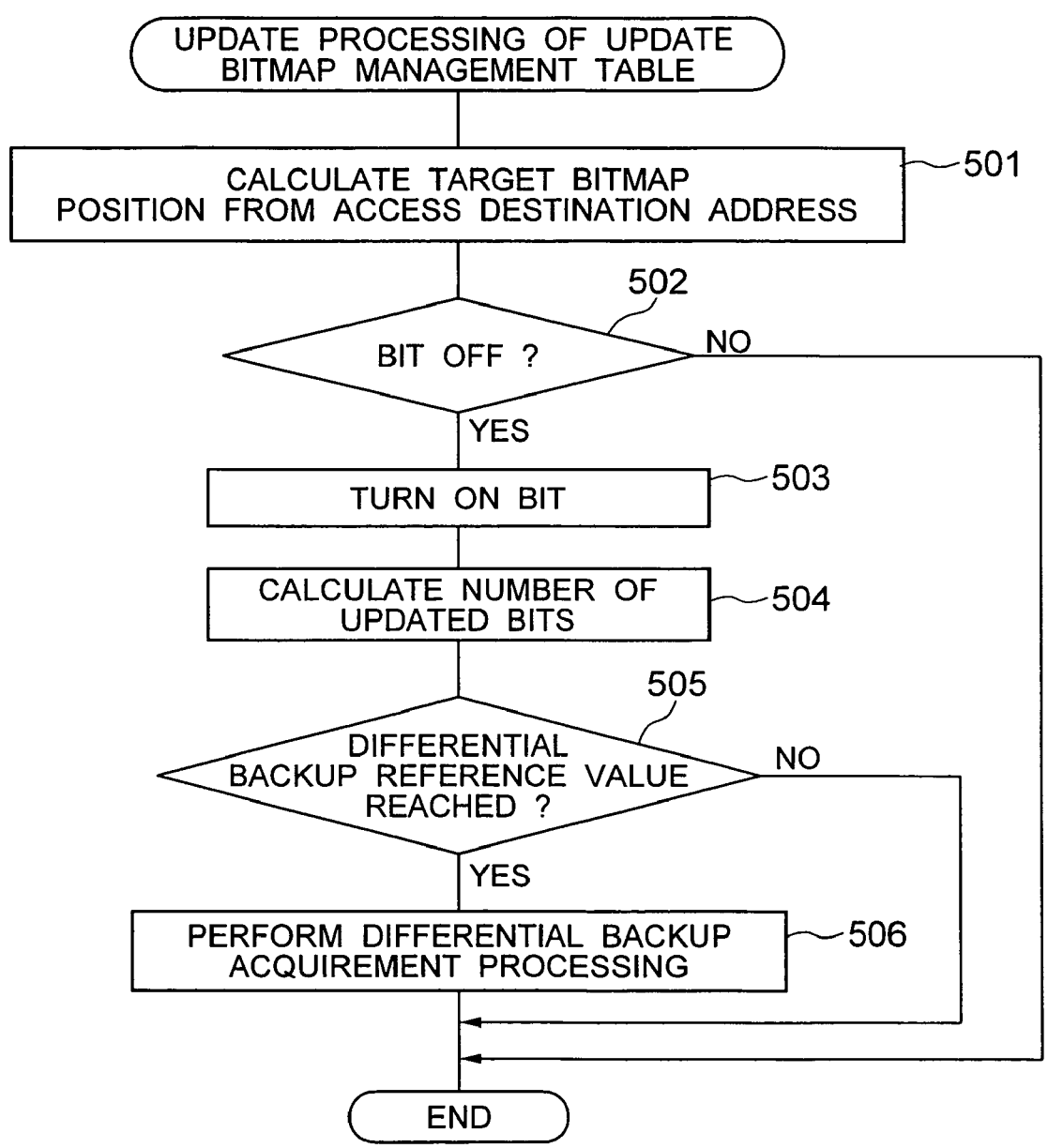
FIG. 5 is a flowchart showing processing steps for update processing of an update bitmap management table in the first embodiment.

FIG. 5 is a flowchart showing processing steps for update processing of the bitmap management table in this embodiment. At step 501, the bitmap processing unit 105 of the host computer 100 receives from the DB buffer management unit 103 or the checkpoint processing unit 104 the access destination address to be accessed by the write command. Then, the bitmap processing unit 105 calculates the target bitmap position from the access destination address.

At step 502, the bitmap processing unit 105 reads the update bitmap management table 109 in the main storage device, and checks whether bit information in the target bitmap position calculated at step 501 is off. If it has been found that the bit information in the target bitmap position is off, the operation proceeds to step 503.

At step 503, the bitmap processing unit 105 turns on the bit information in the target bitmap position, thereby storing in the update bitmap management table 109 updated bit information indicating that data in the backup target DB region 111 corresponding to the target bitmap position has been updated.

At step 504, the bitmap processing unit 105 reads bit information in respective bitmap positions in the update bitmap management table 109, and counts the number of the updated bit information of which the bit information is on, thereby calculating the number of updated bits.

At step 505, the number of the updated bits calculated at step 504 is compared with the differential backup reference value for estimating the differential backup processing time. If the number of the updated bits has reached the differential backup reference value, the operation proceeds to step 506.

At step 506, the bitmap processing unit 105 commands the backup processing unit 106 to perform backup of data in the backup target DB region 111, corresponding to the updated bit information, to the differential backup volume 113.

The differential backup reference value is herein calculated from the size of the storage region of the differential backup volume 113 for storing data for differential backup and the size of the data corresponding to the updated bit information. For calculation of the differential backup reference value, the differential backup volume 113 is accessed, for example, and the size of the storage region for storing the data for the differential backup is obtained. Then, division expressed in the following Formula 1 is performed, and the result of the division with a resulting remainder rounded down is set to the differential backup reference value.

Differential Backup Reference Value=(Differential Backup Data Storage Region Size)/(Size of Data Equivalent to Updated Bit Series Information). [Formula 1]

It is assumed that the size of the data equivalent to one updated bit information is set in advance at the time of creation of the backup target DB region 111 and the update bitmap management table 109.

The differential backup reference value may also be calculated from the time assigned for acquirement of the backup and the time required for backing up the data equivalent to one updated bit information. More specifically, the time that can be assigned for obtaining the differential backup is received from the user using an input device or the like in advance, and then division expressed in the following Formula 2 is performed. The result of the division with the resulting remainder rounded down is then set to the differential backup reference value.

Differential Backup Reference Value=(Time Assigned for Differential Backup)/(Time Required for Backup of Data Equivalent to One Updated Bit Information). [Formula 2]

It is assumed that the time required for backing up the data corresponding to one updated bit information is set in advance from the data transfer rates of the cache memory of the storage device 110, magnetic disk devices, and the like and the size of the data equivalent to one updated bit information.

The bitmap processing unit 105 in this embodiment commands the backup processing unit 106 to perform backup to the differential backup volume 113 at step 506. As an alternative to this method, the number of updated bits is accumulated and recorded for each command for differential backup, and when the accumulated number of the updated bits has reached the reference value for starting the full backup, the bitmap processing unit 105 may command the backup processing unit 106 to perform backup of all data corresponding to bit information in the update bitmap management table 109.

When the accumulated amount of data for differential backup has exceeded the amount of data for full backup, the full backup is obtained, using this processing. The processing time required for recovery processing can be thereby reduced.

It is assumed that the reference value for starting the full backup is calculated from the size of data when the full backup is performed and the size of data equivalent to one updated bit information. For calculation of the reference value for starting the full backup, the backup target DB region 111 is accessed, for example, and the size of the data for the full backup is obtained. Then, division expressed in the following Formula 3 is performed, and the result of the division with a resulting remainder rounded down is set to the reference value for starting the full backup.

Reference Value for Starting Full Backup=(Size of Data for Full Backup)/(Size of Data Equivalent to One Updated Bit Information). [Formula 3]

It is assumed that the size of the data equivalent to one updated bit information is set in advance at the time of creation of the backup target DB region 111 and the update bitmap management table 109, as described before.

As an alternative to this method, in view of processing overhead when the amount of data for the full backup is processed by differential backups using a plurality of write commands, by dividing the processing overhead by the time required for backup of data equivalent to one bit information, and subtracting the resulting value from the result of the division using Formula 3, the reference value for starting the full backup may be set to a lower value.

On the other hand, if the number of updated bits has reached the differential backup reference value in a short time due to execution of high-volume batch update processing, it is sometimes inappropriate to perform differential backup. Thus, when the number of updated bits has reached the differential backup reference value within an update processing detection time, which is the time for detecting high-volume update processing, the number of updated bits may be checked when the updated amount has decreased to a certain level. Then, either of differential backup or full backup may be performed according to the number of the updated bits.

Figure 6:
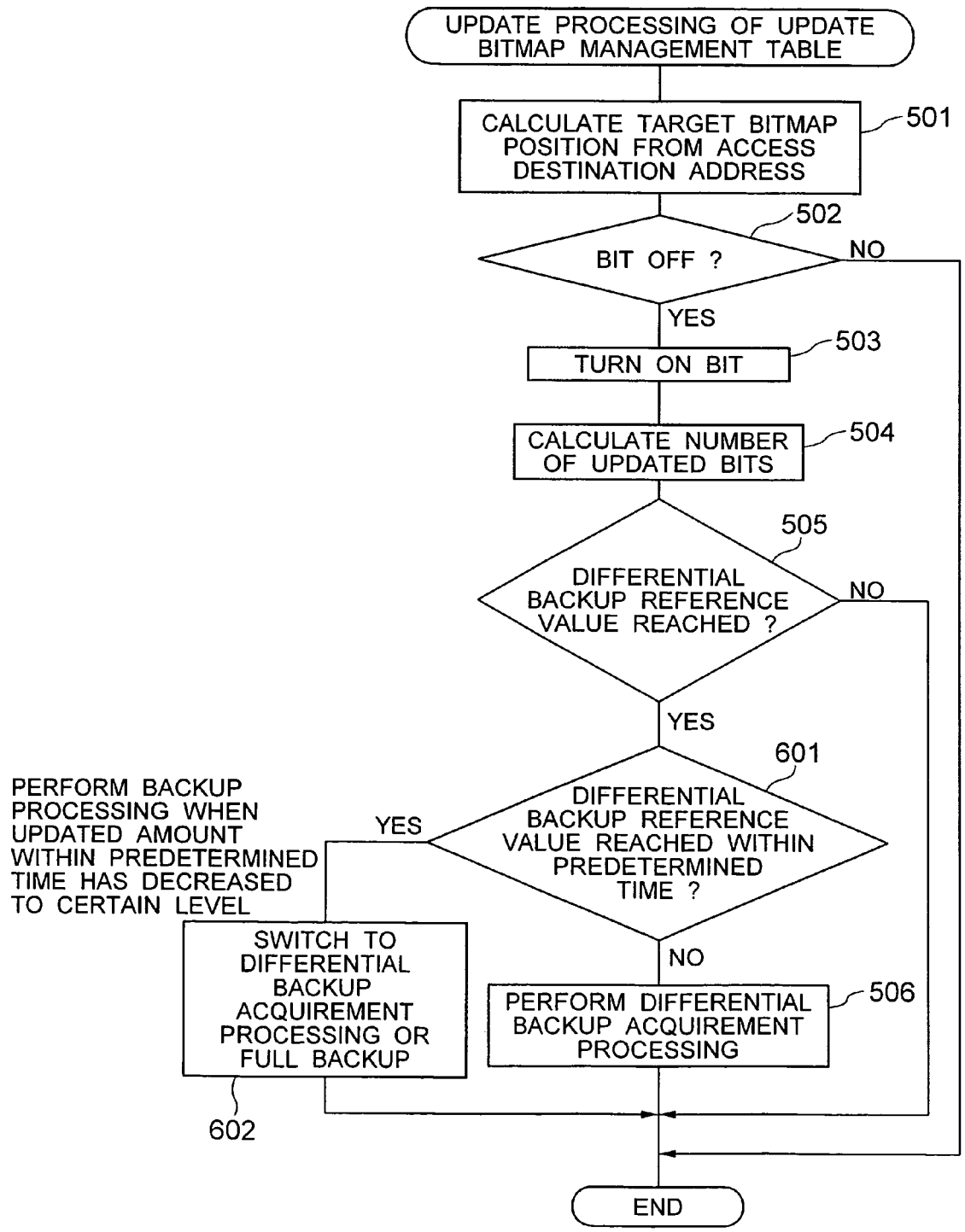
FIG. 6 is a flowchart showing processing steps for update processing of the update bitmap management table when high-volume update processing has been detected, in the first embodiment.

FIG. 6 is a flowchart showing processing steps for update processing of update bitmap management table when high-volume update processing has been detected, in the first embodiment. As shown in FIG. 6, the same processing as those from step 501 to step 505 in FIG. 5 is performed.

At step 601, the bitmap processing unit 105 reads out backup completion time information indicating the date and time of completion of a preceding backup acquirement from the backup control and management information 114. Then, the bitmap processing unit 105 calculates a difference between the read date and time and the current date and time to obtain the time elapsed from the preceding backup acquirement. Then, the bitmap processing unit 105 compares the elapsed time obtained with the update processing detection time, which is a predetermined time required for detecting high-volume update processing to check whether the elapsed time is smaller than the update processing detection time or whether the number of the updated bits has reached the differential backup reference value within the update processing detection time. Then, if the number of the updated bits has reached the differential backup reference value within the update processing detection time, the operation proceeds to step 602.

At step 602, the bitmap processing unit 105 counts the number of updated bits in the update bitmap management table 109 at a predetermined interval of time to obtain the number of the increment of the updated bits. Then, the bitmap processing unit 105 repeats processing of monitoring the number of the increment of the updated bits until the number of the increment of the updated bits within the predetermined time becomes less than the reference value for detecting update processing.

Then, when the number of the increment of the updated bits within the predetermined time has become less than the reference value for detecting the update processing, the bitmap processing unit 105 compares the number of the updated bits at that point with the reference value for starting the full backup. When the number of the updated bits has reached the reference value for starting the full backup, the bitmap processing unit 105 commands the backup processing unit 106 to perform backup of all data in the corresponding DB region in the backup target DB region 111 to the full backup volume 112. When the number of the updated bits has not reached the reference value for starting the full backup, the bitmap processing unit 105 commands the backup processing unit 106 to perform backup of data in the backup target DB region 111 corresponding to the information of the updated bits to the differential backup volume 113.

It is assumed that the time for detecting update processing is set from the processing time for performing processing that involves high-volume update processing such as batch processing executed by the host computer 100. It is also assumed that the reference value for detecting the update processing within the predetermined time is set from the number of the increment of updated bits during the update processing detection time when the processing that involves the high-volume update processing is executed. If the average value of the processing time for performing high-volume batch update processing executed by the host computer 100 is 60 minutes and the average number of the increment of updated bits is 600 in the 60 minutes, for example, the update processing detection time is set to 60 minutes, the predetermined time for checking the number of the increment of the updated bits is set to one minute, and the reference value for detecting the update processing is the number of updated bits of one, which is 10% of the average increment rate.

Upon receipt of a command for backup from the bitmap processing unit 105, the backup processing unit 106 in the host computer 100 in this embodiment reads out updated bit information stored in the update bitmap management table 109 in the main storage device, and duplicates data in the backup target DB region 111 corresponding to the updated bit information to the differential backup volume 113 or duplicates all data in the corresponding backup target DB region 111 to the full backup volume 112, as described before, thereby obtaining a backup.

Figure 7:
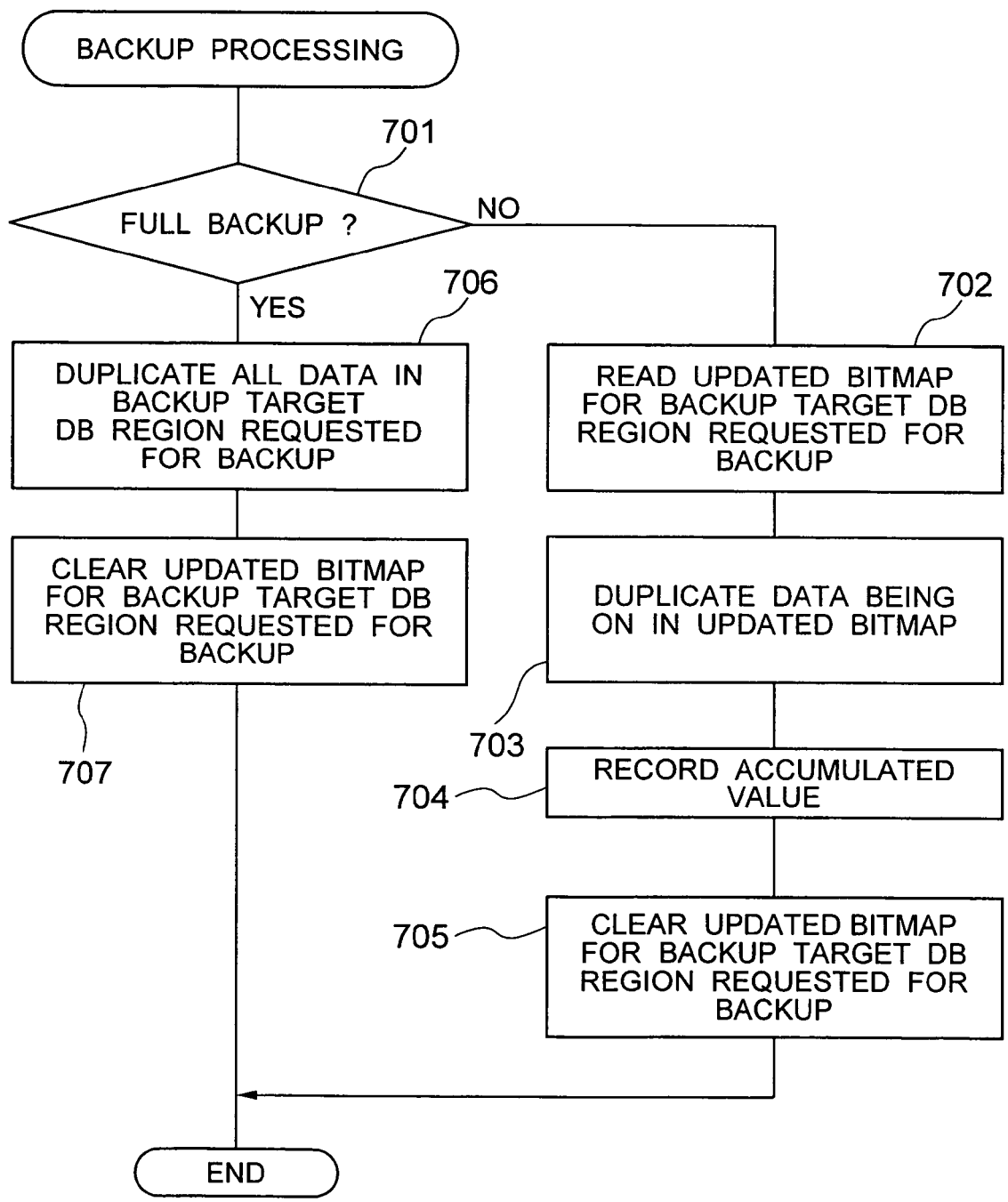
FIG. 7 is a flowchart showing processing steps for backup processing in the first embodiment.

FIG. 7 is a flowchart showing processing steps for backup processing in this embodiment. Upon receipt of a command for backup from the bitmap processing unit 105, the backup processing unit 106 in the host computer 100 checks whether the content of the command is to perform full backup or not at step 701. If the content of the command is not to perform the full backup, the operation proceeds to step 702.

At step 702, the backup processing unit 106 reads the updated bitmap for the backup target DB region 111 for which the request for the backup has been made, from the update bitmap management table 109 in the main storage device.

At step 703, the backup processing unit 106 duplicates the data of which bit information is on in the updated bitmap read at step 702, from the backup target DB region 111 to the differential backup volume 113, and stores management information such as the name of the DB region on which the differential backup has been performed, the type of the backup, the start and end times of the backup, the backup destination, and updated bitmap information in the storage device as the backup control and management information 114.

FIG. 8 is a table showing an example of a backup management table managed by the host computer in this embodiment. FIG. 8 shows an example of various management information when the backup control and management information 114 is managed by the host computer 100. The backup management table stores management information such as the name of the DB region of "DBAREA1-3" on which backup processing has been performed, the types of the backup such as "FULL", "differential", and updated bitmap information of "111111111 . . . ".

In this embodiment, when the number of updated bits has reached the differential backup reference value, a differential backup is obtained. Thus, the amount of data duplicated from the backup target DB region 111 to the differential backup volume 113 at step 703 always becomes a predetermined size. Estimation of the processing time required for the backup processing thus can be easily performed.

On the other hand, when the recovery processing unit 107 of the host computer 100 performs database recovery processing by duplicating data from the differential backup volume 113 to the backup target DB region 111 if a failure occurs, differential backup data of the predetermined size will be duplicated according to the content recorded in the backup management table. Thus, estimation of the processing time required for the recovery processing can also be performed easily.

At step 704, the backup processing unit 106 counts the number of updated bit information of which bit information is on in the updated bitmap read at step 702 to obtain the number of updated bits. Then, the backup processing unit 106 adds the number of the obtained updated bits to the accumulated value of the number of updated bits stored in the main storage device in the preceding processing. Then, the backup processing unit 106 stores the resulting value again in the main storage device, thereby recording the accumulated value of the number of updated bits.

At step 705, the backup processing unit 106 clears the update bitmap management table 109 in the main storage device that stores the updated bitmap for the backup target DB region 111 for which the backup request has been made.

On the other hand, when the content of the command received from the bitmap processing unit 105 is to perform full backup at step 701, the operation proceeds to step 706.

At step 706, the backup processing unit 106 duplicates all data in the corresponding DB region in the backup target DB region 111 for which the backup request has been made to the full backup volume 112, and stores the management information such as the name of the DB region on which the full backup has been performed, the type of the backup, the start and end times of the backup, the backup destination, and updated bitmap information in the storage device as the backup control and management information 114.

At step 707, the backup processing unit 106 clears the update bitmap management table 109 in the main storage device that stores the updated bitmap for the backup target DB region 111 for which the backup request has been made and the accumulated value of the number of the updated bits stored in the main storage device.

In the processing described before at step 703, the backup processing unit 106 duplicates the data of which bit information is on in the updated bitmap read at step 702 from the backup target DB region 111 to the differential backup volume 113. At this point, in order to reduce processing overhead at the times of transmission and reception and thereby improve the input and output efficiency of the backup processing system, a region corresponding to consecutive updated bit information may be collectively duplicated using one write command. Alternatively, when the number of updated bit information in a predetermined bitmap range in the updated bitmap is equal to or more than the backup modification reference value, the write command for backup of all data including data corresponding to the bit information being off in the bitmap range as well may be created.

Figure 12A:
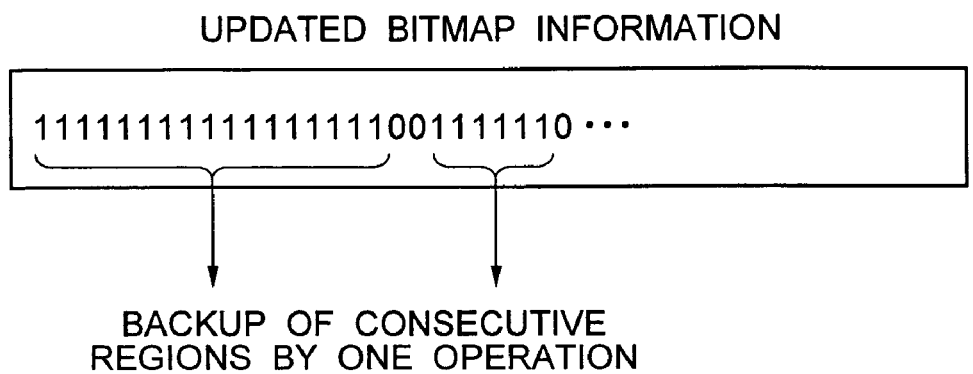
FIGS. 12A and 12B show examples of improving the input and output efficiency of the backup processing system in the first embodiment.
Figure 12B:
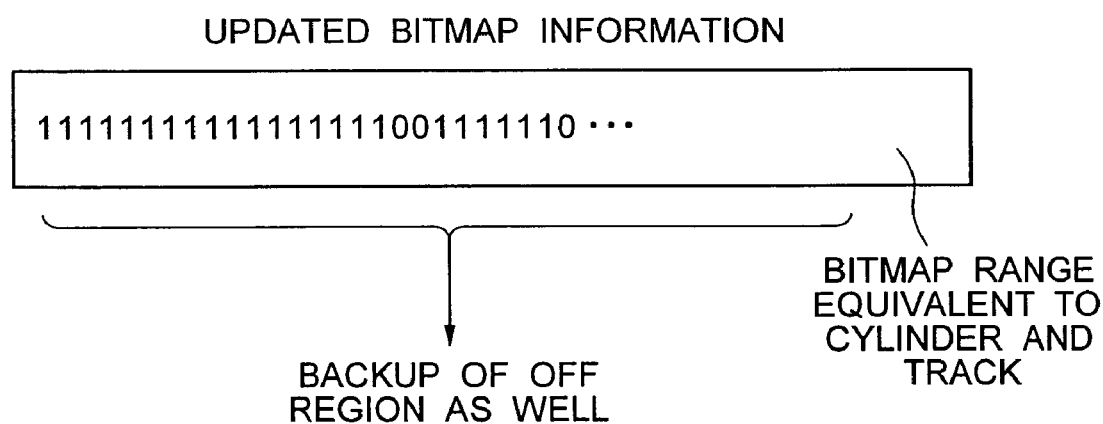

FIGS. 12A and 12B are diagrams showing examples in which the input and output efficiency has been improved in this embodiment. As shown in FIGS. 12A and 12B, in this embodiment, a region corresponding to consecutive updated bit information is backed up by one operation, or all data including the data corresponding bit information being off (indicated by 0 in FIGS. 12A and 12B) in the predetermined bit map range as well is backed up, thereby improving the input and output efficiency.

The backup modification reference value is herein calculated from the total number of bits in the predetermined bitmap range and the processing overhead when the size of the data corresponding to the updated bit information in the predetermined bitmap range is processed using a plurality of write commands. The processing overheads resulting from the differential backup for the bitmap range equivalent to a predetermined unit such as a cylinder or a track by a plurality of write commands are measured in advance, for example. Then, the average value of the processing overheads is calculated. Finally, the result of calculation using the following formula 4 is set to the backup modification reference value.

Backup Modification Reference Value=(Total Number of Bits in Predetermined Bitmap Range−Average Value of Processing Overheads)/(Time Required for Backup of Data Equivalent to One Updated Bit Information). [Formula 4]

The average value of the processing overheads is the value obtained by averaging the processing overheads when the size of the data corresponding to the updated bit information in the predetermined bitmap range has been processed using a plurality of write commands. It is assumed that the time required for backup of data equivalent to one updated information is set in advance from the data transfer rates of the cache memory of the storage device 110, the magnetic disk devices, and the like, and the size of the data equivalent to one updated bit information.

As described above, according to the backup processing system in this embodiment, when the number of updated bit information in the update bitmap management table has reached the predetermined reference value for estimating the processing time of differential backup, backup of the data corresponding to the updated bit information is obtained. By always obtaining the differential backup of the data of the predetermined size, estimation of the processing times required for the backup processing and the recovery processing can be facilitated.

Second Embodiment

A backup processing system according to a second embodiment, which performs backup of database data by the storage device will be described.

Though the update processing of the update bitmap management table and the backup processing in the first embodiment were described to be the ones performed by the host computer 100, these processing may be controlled by the storage device 110.

Figure 9:
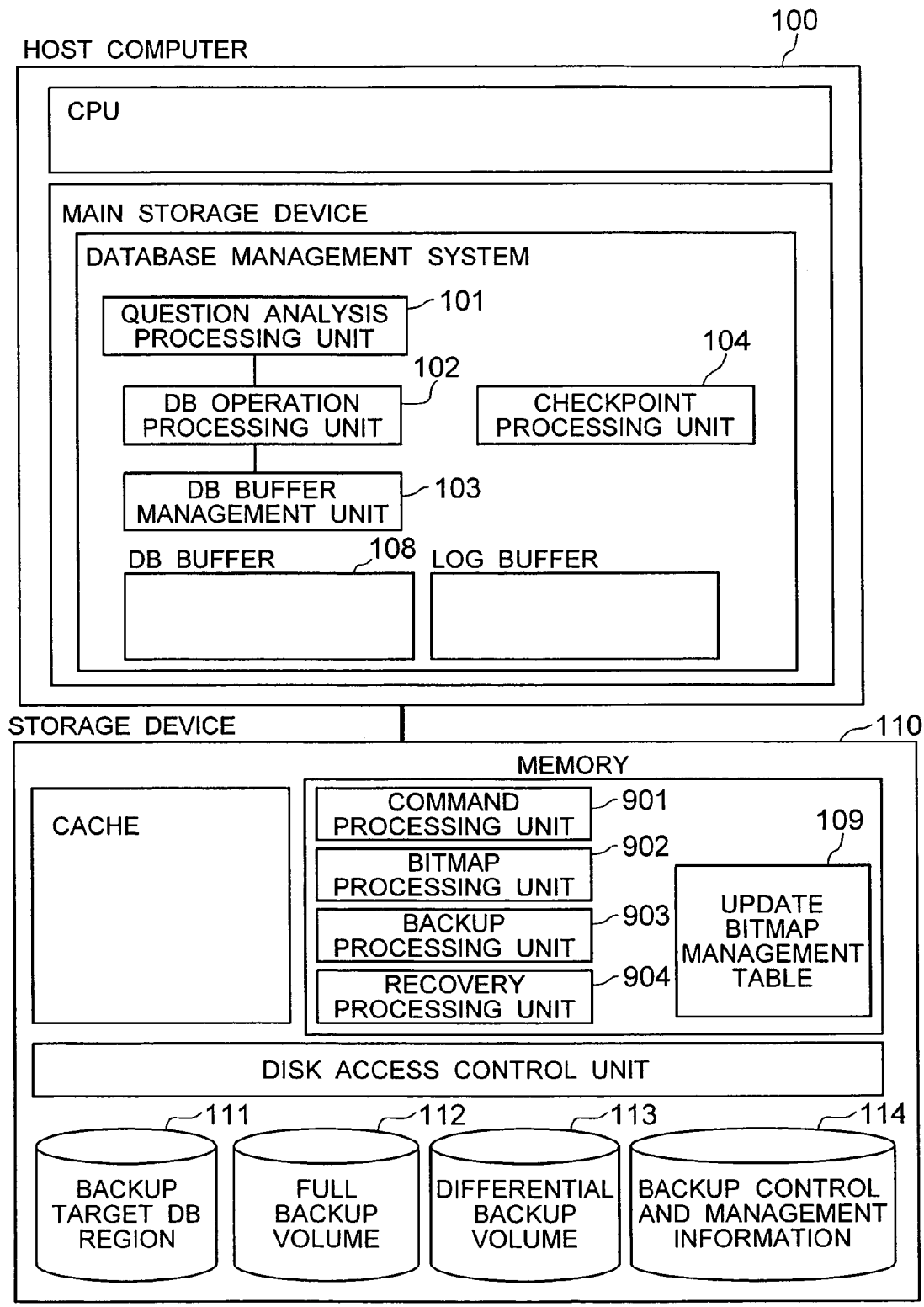
FIG. 9 is a diagram showing a schematic configuration of a backup processing system in a second embodiment of the present invention.

FIG. 9 is a diagram showing a schematic configuration of the backup processing system in this embodiment. As shown in FIG. 9, the storage device 110 includes a command processing unit 901, a bitmap processing unit 902, a backup processing unit 903, and a recovery processing unit 904.

The command processing unit 901 receives a request for writing data from the host computer 100 and updates the backup target DB region 111 and the cache memory according to the content of the received request for writing the data.

When data in the backup target DB region 111 has been updated, the bitmap processing unit 902 stores in the update bitmap management table 109 in the memory of the storage device 110 updated bit information indicating that the data has been updated. When the number of updated bit information in the update bitmap management table 109 has reached the differential backup reference value for estimating the differential backup processing time, the bitmap processing unit 902 commands the backup processing unit 903 to perform backup of data in the backup target DB region 111 corresponding to the updated bit information to the differential backup volume 113.

The backup processing unit 903 reads out the updated bit information stored in the update bitmap management table 109 in the memory upon receipt of the command for the backup, duplicates the data in the backup target DB region 111 corresponding to the updated bit information to the differential backup volume 113 or duplicates all data in the corresponding DB region in the backup target DB region 111 to the full backup volume 112, thereby obtaining the backup.

The recovery processing unit 904 duplicates data from the full backup volume 112 and the differential backup volume 113 to the backup target DB region 111 when a failure occurs, thereby performing database recovery processing.

A program for causing the storage device 110 to function as the command processing unit 901, bitmap processing unit 902, backup processing unit 903, and recovery processing unit 904 is recorded on a recording medium such as a ROM or the like and run. The recording medium for recording the program may be other recording medium except for the ROM. The program may be installed from the recording medium to the information processing device for use, or the recording medium may be accessed through the network to use the program.

Though other configurations in this embodiment are assumed to be the same as those in the first embodiment, the DB buffer management unit 103 and the checkpoint processing unit 104 in this embodiment, which are different from those in the first embodiment, do not command the bitmap processing unit 902 to update bit information in the update bitmap management table 109. Upon receipt of the write command through the command processing unit 901, the storage device 110 commands the bitmap processing unit 902 to update the update bitmap management table 109.

Figure 10:
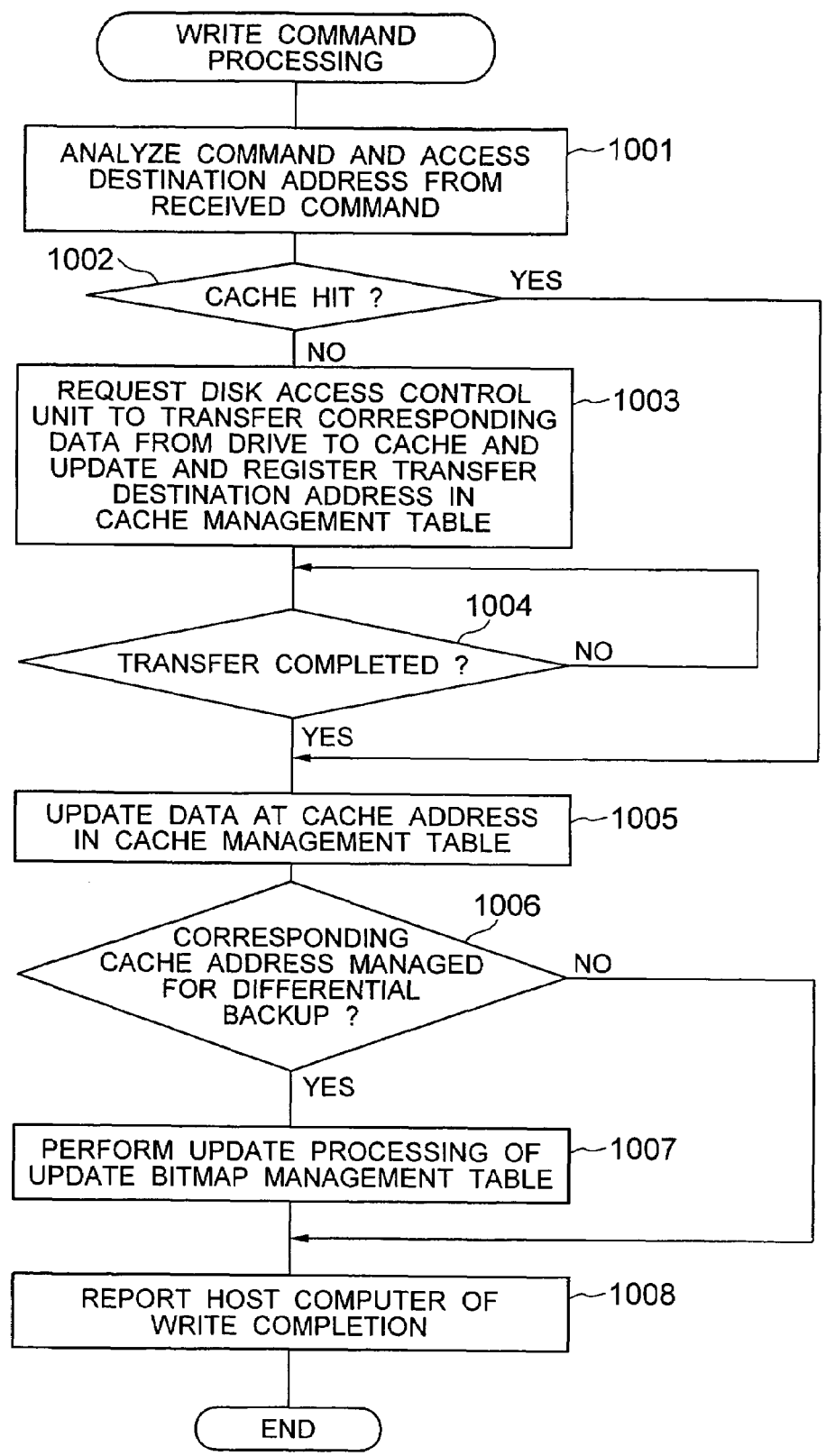
FIG. 10 is a flowchart showing processing steps for write command processing in the second embodiment.

FIG. 10 is a flowchart showing processing steps for write command processing in this embodiment. Upon receipt of a command from the host computer 100, the command processing unit 901 in the storage device 110 analyzes the type of the command and the access destination address from the received command, and recognizes that the received command is a write command, at step 1001. It is assumed that, from the access destination address, by making a comparison with information in a device configuration management table indicating addresses assigned to a plurality of disk subsystems and respective magnetic disk devices of the disk subsystems, the number of the disk control device and the number of the drive for the access destination address can be identified.

Next, at step 1002, the command processing unit 901 checks whether data at the access destination address analyzed at step 1001 is held in the cache memory of the storage device 110 or not, and determines whether there is a cache hit.

In the case of a cache miss in which the data at the access destination address is not held in the cache memory, the operation proceeds to step 1003. Then, the number of the drive for the access destination address is identified as described before. Then, to the disk access control unit of the storage device 110, a request for transferring the data at the access destination address from the magnetic disk device corresponding to the identified number of the drive to the cache memory is made. The transfer destination address is registered in the cache management table by the unit 901.

At step 1004, the command processing unit 901 checks whether the transfer processing described above has been completed or not. If the transfer processing has been completed, the operation proceeds to step 1005.

When it has been determined at step 1002 that there is a cache hit, or when the transfer processing at step 1004 has been completed, the command processing unit 901 performs updating of the data in the cache memory of the storage device 110 at step 1005. That is, the command processing unit 901 writes the content of the data received from the host computer 100 to the cache memory. Alternatively, the command processing unit 901 may update the backup target DB region 111 of the storage device 110 according to the write request received.

At step 1006, the command processing unit 901 checks whether the corresponding address in the cache memory on which the data writing has been performed is the address to be managed for differential backup or the address in the backup target DB region 111. If the address is the one in the backup target DB region 111, the operation proceeds to step 1007.

At step 1007, the access destination address on which the data writing has been performed is given to the bitmap processing unit 902, and the command processing unit 901 commands the bitmap processing unit 902 to update bit information in the update bitmap management table 109 corresponding to the data of which the updating has been performed.

Then, at step 1008, the command processing unit 901 reports completion of the write command processing to the host computer 100.

When data in the cache memory and the backup target DB region 111 in the storage device 110 has been updated by the command processing unit 901 as described before, the bitmap processing unit 902 in the storage device 110 in this embodiment stores in the update bitmap management table 109 in the memory updated bit information indicating that the data has been updated. When the number of updated bit information in the update bitmap management table 109 has reached the differential backup reference value for estimating the differential backup processing time, the bitmap processing unit 902 commands the backup processing unit 903 to perform backup of data in the backup target DB region 111 corresponding to the updated bit information to the differential backup volume 113.

This processing is the same as the processing by the host computer 100 shown in FIG. 5. The update processing of the update bitmap management table by the storage device 110 will be described with reference to FIG. 5.

After receiving the access destination address to be accessed by a write command from the command processing unit 901, the bitmap processing unit 902 of the storage device 110 calculates the target bitmap position from the access destination address, at step 501.

At step 502, the bitmap processing unit 902 reads out the update bitmap management table 109 in the memory, and checks whether bit information in the target bitmap position calculated at step 501 is off or not. If it has been found that the bit information in the target bitmap position is off, the operation proceeds to step 503.

At step 503, the bitmap processing unit 902 turns on the bit information in the target bitmap position, thereby storing in the update bitmap management table 109 updated bit information indicating that data in the backup target DB region 111 corresponding to the target bitmap position has been updated.

At step 504, the bitmap processing unit 902 reads bit information in respective bitmap positions in the update bitmap management table 109, and counts the number of the updated bit information of which the bit information is on, thereby calculating the number of updated bits.

At step 505, the bitmap processing unit 902 compares the number of the updated bits calculated at step 504 with the differential backup reference value for estimating the differential backup processing time. If the number of the updated bits has reached the differential backup reference value, the operation proceeds to step 506.

At step 506, the bitmap processing unit 902 commands the backup processing unit 903 to perform backup of data in the backup target DB region 111 corresponding to the updated bit information to the differential backup volume 113.

Calculation of the differential backup reference value is performed in the same manner as in the first embodiment: the differential backup reference value may be calculated from the size of a storage region in the differential backup volume 113 for storing data for differential backup and the size of the data corresponding to the updated bit information. Alternatively, the differential backup reference value may also be calculated from the time assigned for acquirement of the backup and the time required for backing up the data equivalent to one updated bit information.

Further, as in the first embodiment, when the accumulated number of updated bits resulting from the differential backups has reached the reference value for starting the full backup, the bitmap processing unit 902 may command the backup processing unit 903 to perform backup of all data corresponding to bit information in the update bitmap management table 109.

Still further, as in the processing by the host computer 100 shown in FIG. 6, if the number of updated bits has reached the differential backup reference value within the update processing detection time for detecting high-volume update processing, the number of updated bits may be checked when the updated amount has decreased to a certain level. Then, either of differential backup or full backup may be performed according to the number of the updated bits.

More specifically, after the same processing as those from step 501 to step 505 in FIG. 5 has been performed, the bitmap processing unit 902 reads out backup completion time information indicating the date and time of completion of a preceding backup acquirement from the backup control and management information 114. Then, the bitmap processing unit 902 calculates a difference between the read date and time and the current date and time to obtain the time elapsed from the preceding backup acquirement. Then, the bitmap processing unit 902 compares the obtained elapsed time with the update processing detection time, which is the predetermined time required for detecting high-volume update processing to check whether the elapsed time is smaller than the update processing detection time or whether the number of updated bits has reached the differential backup reference value within the update processing detection time. Then, if the number of the updated bits has reached the differential backup reference value within the update processing detection time, the operation proceeds to step 602.

At step 602, the bitmap processing unit 902 counts the number of updated bits in the update bitmap management table 109 at a predetermined interval of time to obtain the number of the increment of the updated bits. Then, the bitmap processing unit 902 repeats processing of monitoring the number of the increment of the updated bits until the number of the increment of the updated bits within the predetermined time becomes less than the reference value for detecting the update processing.

Then, when the number of the increment of the updated bits within the predetermined time has become less than the reference value for detecting the update processing, the bitmap processing unit 902 compares the number of the updated bits at that point with the reference value for starting the full backup. When the number of the updated bits has reached the reference value for starting the full backup, the bitmap processing unit 902 commands the backup processing unit 903 to perform backup of all data in the corresponding DB region in the backup target DB region 111 to the full backup volume 112. When the number of the updated bits has not reached the reference value for starting the full backup, the bitmap processing unit 902 commands the backup processing unit 903 to perform backup of data in the backup target DB region 111 corresponding to the information of the updated bits to the differential backup volume 113.

Upon receipt of a command for backup from the bitmap processing unit 902, the backup processing unit 903 in the storage device 110 in this embodiment reads out updated bit information stored in the update bitmap management table 109 in the memory, and duplicates data in the backup target DB region 111 corresponding to the updated bit information to the differential backup volume 113 or duplicates all data in the corresponding DB region in the backup target DB region 111 to the full backup volume 112, as described before, thereby obtaining a backup.

This processing is the same as the processing by the host computer 100, shown in FIG. 7. The backup processing by the storage device 110 will be described with reference to FIG. 7.

Upon receipt of a command for backup from the bitmap processing unit 902, the backup processing unit 903 in the storage device 110 checks whether the content of the command is to perform full backup or not at step 701. If the content of the command is not to perform the full backup, the operation proceeds to step 702.

At step 702, the backup processing unit 903 reads the updated bitmap for the backup target DB region 111 for which the backup request has been made, from the update bitmap management table 109 in the memory.

At step 703, the backup processing unit 903 duplicates the data of which bit information is on in the updated bitmap read at step 702, from the backup target DB region 111 to the differential backup volume 113, and stores management information such as the name of the DB region on which the differential backup has been performed, the type of the backup, LUN, the start and end times of the backup, the backup destination, and updated bitmap information in the storage device as the backup control and management information 114.

FIG. 11 is a diagram showing an example of a backup management table managed by the storage device in this embodiment. FIG. 11 shows an example of various management information when the backup control and management information 114 is managed by the storage device 110. The backup management table stores management information including the name of the DB region such as "DBAREA1-3" on which backup processing has been performed, the types of the backup such as "FULL" and "differential", and updated bit map information such as "111111111 . . . ". LUN in FIG. 11 indicates the number for identifying an LU (logical unit) of the storage device.

In this embodiment, when the number of updated bits has reached the differential backup reference value, a differential backup is obtained. Thus, the amount of data duplicated from the backup target DB region 111 to the differential backup volume 113 at step 703 always becomes a predetermined size. Estimation of the processing time required for the backup processing thus can be easily performed.

When the recovery processing unit 904 of the storage device 110 performs database recovery processing by duplicating data from the differential backup volume 113 to the backup target DB region 111 when a failure occurs, differential backup data of the predetermined size will be duplicated according to the content recorded in the backup management table. Thus, estimation of the processing time required for the recovery processing can also be performed easily.

At step 704, the backup processing unit 903 counts the number of updated bit information of which bit information is on in the updated bitmap read at step 702 to obtain the number of updated bits. Then, the backup processing unit 903 adds the number of the updated bits to the accumulated value of the number of updated bits stored in the memory in the preceding processing. Then, the backup processing unit 903 stores the resulting value again in the memory, thereby recording the accumulated value of the number of updated bits.

At step 705, the backup processing unit 903 clears the update bitmap management table 109 in the memory that stores the updated bitmap for the backup target DB region 111 for which the backup request has been made.

On the other hand, when the content of the command received from the bitmap processing unit 902 is to perform full backup, the operation proceeds to step 706.

At step 706, the backup processing unit 903 duplicates all data in the backup target DB region 111 for which the backup request has been made to the full backup volume 112, and stores the management information such as the name of the DB region on which the full backup has been performed, the type of the backup, LU, the start and end times of the backup, the backup destination, and updated bitmap information in the storage device as the backup control and management information 114.

At step 707, the backup processing unit 903 clears the update bitmap management table 109 in the memory that stores the updated bitmap for the backup target DB region 111 for which the backup request has been made and the accumulated value of the number of the updated bits stored in the memory.

In the processing described before at step 703, the backup processing unit 903 duplicates the data of which bit information is on in the updated bitmap read at step 702, from the backup target DB region 111 to the differential backup volume 113. Alternatively, when the number of updated bit information in a predetermined bitmap range in the updated bitmap is equal to or more than the backup modification reference value, data corresponding to bit information in the bitmap range may be backed up.

As described before, among the processing in this embodiment, the update processing of the update bitmap management table and the backup processing are performed by the storage device 110. The update processing of the update bitmap management table may be performed by the storage device 110, and the backup processing may be performed by the host computer 100.

More specifically, when data has been updated, updated bit information indicating that the data has been updated is stored in the update bitmap management table 109 in the storage device 110, which is the storage device subsystem. When the number of updated bit information in the update bitmap management table 109 has reached the differential backup reference value, the updated bit information is transmitted to the backup processing unit 106 of the host computer 100. The backup processing unit 106 of the host computer 100 receives the updated bit information and obtains the backup of data corresponding to the updated bit information through control by the host computer 100.

Since updated bitmap management is the processing that depends on an access destination address in the backup target DB region 111, the management can be efficiently performed by the storage device 110. On contrast therewith, the backup processing is sometimes to be performed by application processing already used by the host computer 100. Accordingly, by providing interface for transmitting updated bitmap information from the storage device 110 to the host computer 100 when the number of updated bits has reached the differential backup reference value, the backup processing by the host computer 100 can be performed in cooperation with the storage device 110.

As described above, according to the backup processing system in this embodiment, when the number of updated bit information in the update bitmap management table has reached the predetermined reference value for estimating the differential backup processing time, the backup of data corresponding to the updated bit information is obtained. Thus, by always obtaining the differential backup of the data of the predetermined size, estimation of the processing times required for backup processing and recovery processing can be facilitated.

It should be further understood by those skilled in the art that although the foregoing description has been made on embodiments of the invention, the invention is not limited thereto and various changes and modifications may be made without departing from the spirit of the invention and the scope of the appended claims.

I claim:

1. A database processing method for performing backup of data used in an information processing device having a storage means, the method comprising the steps of:
   storing in an update bitmap management table stored in the storage means updated bit information indicating that data has been updated, when the data has been updated;
   commanding the backup of data corresponding to updated bit information stored in the update bitmap management table when a number of the updated bit information stored in the update bitmap management table has reached a differential backup reference value for estimating differential backup processing time;
   reading out the updated bit information stored in the update bitmap management table in the storage means upon receipt of the command for the backup, and obtaining the backup of the data corresponding to the update bit information stored in the update bitmap management table;
   estimating processing time required for the backup processing from a size of the data corresponding to the updated bit information based on the differential backup reference value;
   estimating processing time required for a recovery processing from the size of data corresponding to the updated bit information and
   estimating a reference value for determining commanding of a full backup of data stored in the storage means when a increment of the updated bits in a perdetermined time interval is less than the reference value.

2. A backup processing system for performing backup of data used in an information processing device having a storage means, the system comprising:
   a bitmap processing unit for storing in an update bitmap management table stored in the storage means updated bit information indicating that data has been updated, when the data has been updated, and commanding the backup of data corresponding to updated bit information stored in the update bitmap management table when a number of the updated bit information stored in the update bitmap management table has reached a differential backup reference value for estimating differential backup processing time;
   a backup processing unit for reading out the updated bit information stored in the update bitmap management table in the storage means upon receipt of the command for the backup, and obtaining the backup of the data corresponding to the update bit information stored in the update bitmap management table;

an estimating processing unit for estimating processing time required for the backup processing from a size of the data corresponding to the updated bit information based on the differential backup reference value, and estimating processing time required for a recovery processing from the size of data corresponding to the updated bit information, and for estimating a reference value for determining commanding of a full backup of data stored in the storage means when an increment of the updated bits in a predetermined time interval is less than the reference value.

* * * * *